United States Patent [19]

Scholz et al.

[11] Patent Number: 4,474,390

[45] Date of Patent: Oct. 2, 1984

[54] GAS CUSHION ON PASSENGER SIDE FOR MOTOR VEHICLES, ESPECIALLY PASSENGER MOTOR VEHICLES

[75] Inventors: Hansjürgen Scholz, Waldenbuch; Luigi Brambilla, Boeblingen; Guenter Walz, Wildberg, all of Fed. Rep. of Germany

[73] Assignee: Daimler-Benz Aktiengesellschaft, Fed. Rep. of Germany

[21] Appl. No.: 476,479

[22] Filed: Mar. 18, 1983

[30] Foreign Application Priority Data

Mar. 19, 1982 [DE] Fed. Rep. of Germany ....... 3210043

[51] Int. Cl.³ .......................................... B60R 21/10
[52] U.S. Cl. ................................................ 280/730
[58] Field of Search .............. 280/730, 727, 728, 729, 280/732, 733, 734, 739, 743; 180/268, 209; 297/468

[56] References Cited

U.S. PATENT DOCUMENTS

| 3,451,694 | 6/1969 | Hass ..................................... 280/743 |
| 3,778,083 | 12/1973 | Hamasaki ............................ 280/739 |
| 3,990,726 | 11/1976 | Oka et al. ............................. 280/739 |
| 4,111,457 | 9/1978 | Kob et al. ............................ 280/728 |
| 4,186,941 | 2/1980 | Scholz et al. .................... 280/734 X |
| 4,262,931 | 4/1981 | Strasser et al. ...................... 280/729 |
| 4,360,223 | 11/1982 | Kirchoff .......................... 280/732 X |

FOREIGN PATENT DOCUMENTS 2944319  5/1981  Fed. Rep. of Germany ...... 280/728

Primary Examiner—Joseph F. Peters, Jr.
Assistant Examiner—Mitchell J. Hill
Attorney, Agent, or Firm—Craig & Burns

[57] ABSTRACT

A gas cushion on the passenger side for motor vehicles, especially for passenger motor vehicles, includes two mutually oppositely disposed approximately trapezoidally shaped surface or boundary areas. The unique shape of the cushion provides a particularly safe protection effect in the critical upper impact area without increase of the overall volume of the gas cushion. One of the trapezoidally shaped boundary areas serves as impact surface facing the passenger while the other trapezoidally shaped boundary area includes at least one opening serving the gas admission. The gas cushion is so arranged in the motor vehicle that the trapezoidally shaped boundary areas taper from top to bottom.

5 Claims, 3 Drawing Figures

U.S. Patent     Oct. 2, 1984     4,474,390

GAS CUSHION ON PASSENGER SIDE FOR MOTOR VEHICLES, ESPECIALLY PASSENGER MOTOR VEHICLES

BACKGROUND OF THE INVENTION

The present invention relates to a gas cushion on the passenger side for motor vehicles, especially passenger motor vehicles, which includes two mutually oppositely disposed, generally trapezoidally shaped front and rear boundary surfaces.

A gas cushion of the same general type as disclosed here is described in the German Auslegeschrift No. 20 30 518. However, in this prior art protective device, the upper, lower and lateral boundary surfaces are constructed trapezoidally shaped whereas the surface facing the passenger and the rear fastening area of the gas cushion are constructed rectangularly.

SUMMARY AND OBJECTS OF THE INVENTION

The present invention is concerned with the task of further improving a gas cushion in such a manner that a reduction of the gas cushion volume is possible without reduction of the cushion dimensions within the upper cushion area which is particularly important in case of impact.

The instant invention solves the underlying problems of the prior art devices with a gas cushion which is generally of the aforementioned type and which has generally trapezoidally shaped front and rear boundary surfaces. The front surface serves as an impact surface facing the passenger and the other trapezoidally shaped boundary surface includes at least one opening serving for the gas inlet. The gas cushion is arranged in the motor vehicle so that the trapezoidally shaped boundary surfaces taper from top to bottom.

These and further objects, features and advantages of the present invention will become more apparent from the following description when taken in connection with the accompanying drawing which shows, for purposes of illustration only, one embodiment in accordance with the present invention, and wherein:

DESCRIPTION OF THE PREFERRED EMBODIMENT

Figure 1:
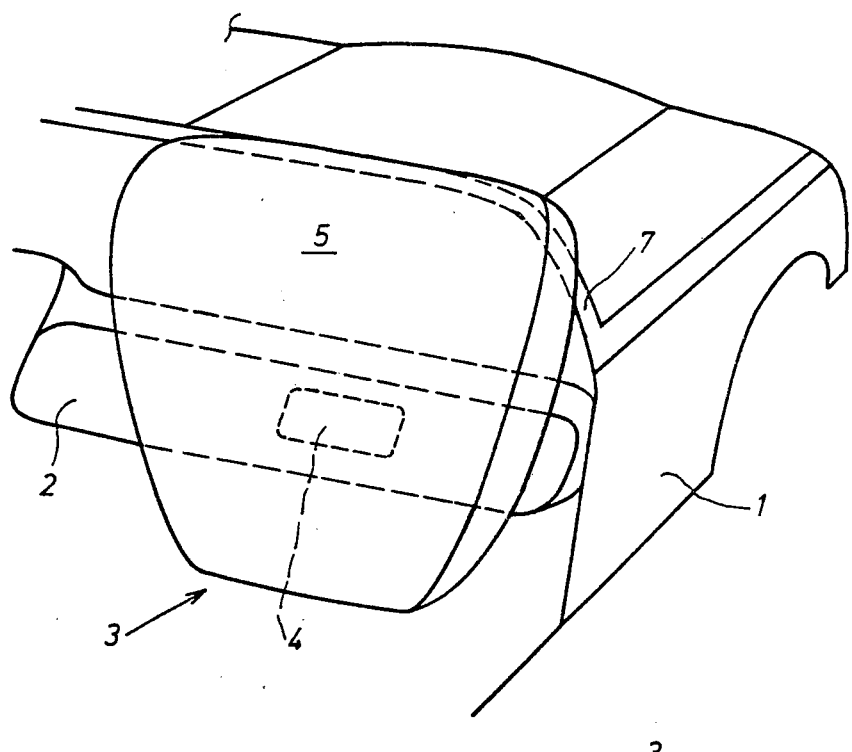
FIG. 1 is a perspective view of an inflated gas cushion on the passenger side in accordance with the present invention.
Figure 3:
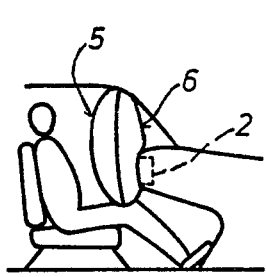
FIG. 3 is a partial schematic side view, similar to FIG. 2, illustrating the gas cushion in accordance with the present invention.
Figure 2:
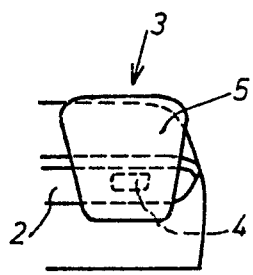
FIG. 2 is a partial schematic elevational view, on a smaller scale, of the inflated gas cushion in accordance with the present invention, as viewed from the passenger seat alongside the driver seat.

Referring now to the drawing wherein like reference numerals are used throughout the various views to designate like parts, the gas cushion is generally designated by reference numeral 3 and is arranged within the area of an instrument panel 2 in front of the passenger seat of a passenger motor vehicle 1 (only indicated in FIG. 1). The cushion 3 is adapted to be filled from a gas generator (not shown) by way of a gas inlet opening 4 included in the trapezoidal shaped, side 6 which is generally facing and at least partially in contact with the instrument panel 2. The side of the cushion 3 facing the passenger is a trapezoidally shaped front boundary area or surface 5 which serves as an impact surface. At its back or rear side, i.e., on the side 6 facing the windshield and instrument panel 2, the gas cushion 3 is of the same general trapezoidal shape as the front boundary area or surface 5 and the gas inlet opening 4 is disposed closer to the lower end of the surface 6.

The gas cushion 3 according to the present invention is therefore sufficiently wide in its upper area, which is particularly important in case of a head impact, in order to cover and protect the passenger from the dangerous front wall column 7, and tapers downwardly to become narrower in the lower part thereof.

As a result of the relatively small volume of the gas cushion, brought about by such a construction, it will be possible in many cases to use identical gas generators for the driver side and the passenger side. The elimination of the need for different sizes of gas generators, i.e., pumps, therefor enables a more cost-favorable manufacture.

A further advantage results from the present invention if a gas cushion as described above is subdivided into upper and lower chambers which are filled one after the other in a predetermined sequence. The particular advantage, in this case, is that the bearing pressure for a child standing in front of the instrument panel at the instant of an accident is decisively reduced by the smaller displacement volume in the lower chamber.

On the other hand, as a result of a larger utilizable gas cushion thickness in the chest area, an earlier retention of the impacting passenger is achieved with the same overall volume compared to customary gas cushions.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A gas cushion for the passenger side of motor vehicles, comprising mutually oppositely disposed generally trapezoidally shaped front and rear surfaces, one of the trapezoidally shaped front and rear surfaces serving as an impact area facing the passenger and the other of the trapezoidally shaped front and rear surfaces including at least one opening serving as a gas inlet, the gas cushion being so arranged in the motor vehicle that the trapezoidally shaped front and rear surfaces taper from top to bottom.

2. A gas cushion as set forth in claim 1, wherein said at least one opening is disposed closer to the bottom than the top.

3. A gas cushion as set forth in claim 1, wherein the top of the cushion is of a size sufficient to protect a passenger from impacting a front column disposed generally forwardly of the passenger.

4. A gas cushion as set forth in claim 1, wherein said gas cushion extends between a passenger and the windshield of the vehicle when the cushion is inflated.

5. A gas cushion as set forth in claim 4, wherein the cushion extends from proximate the knees of a passenger to the windshield and between the passenger and the instrument panel of the vehicle.

* * * * *